April 18, 1950     M. L. MENNESSON     2,504,212
APPARATUS FOR DETERMINING OR CHECKING
THE DIMENSIONS OF PIECES
Filed Sept. 28, 1945     2 Sheets-Sheet 1
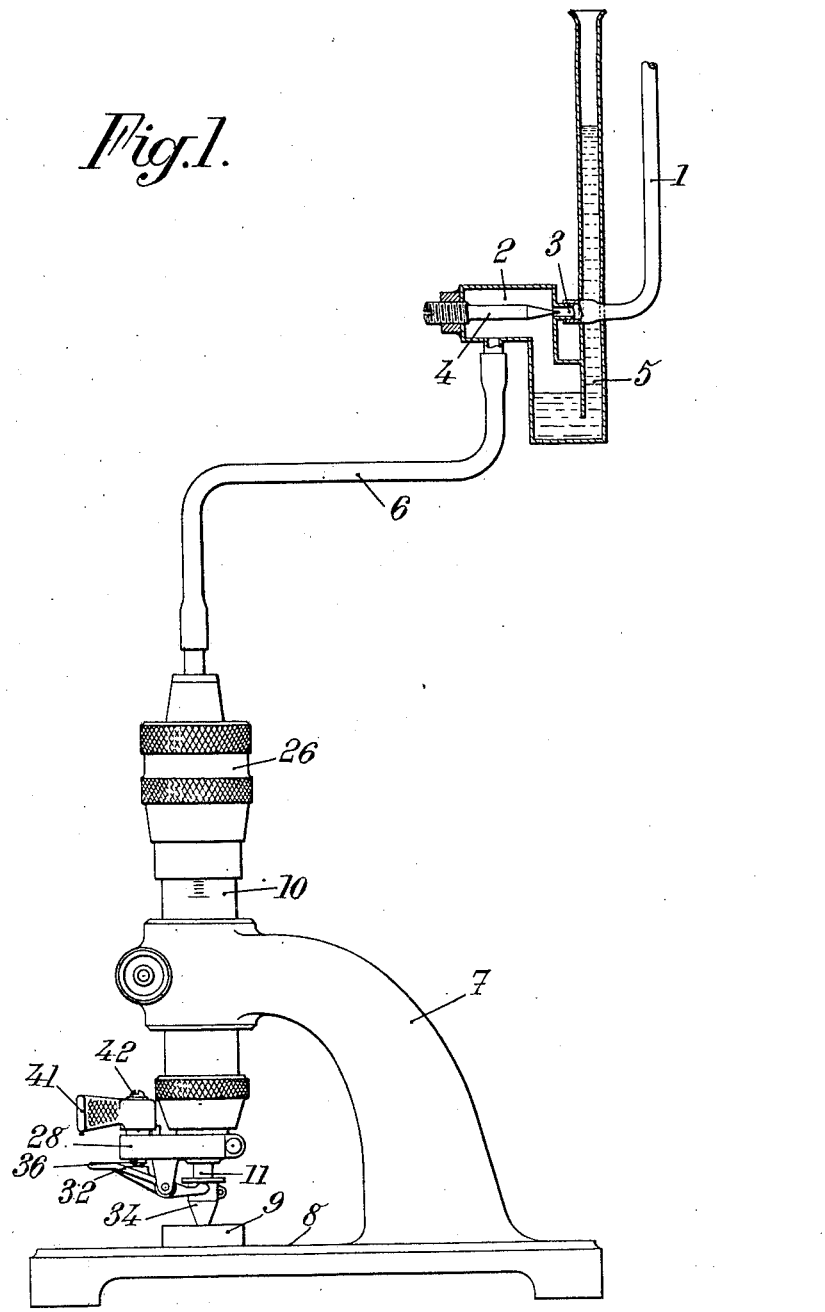
INVENTOR
MARCEL LOUIS MENNESSON

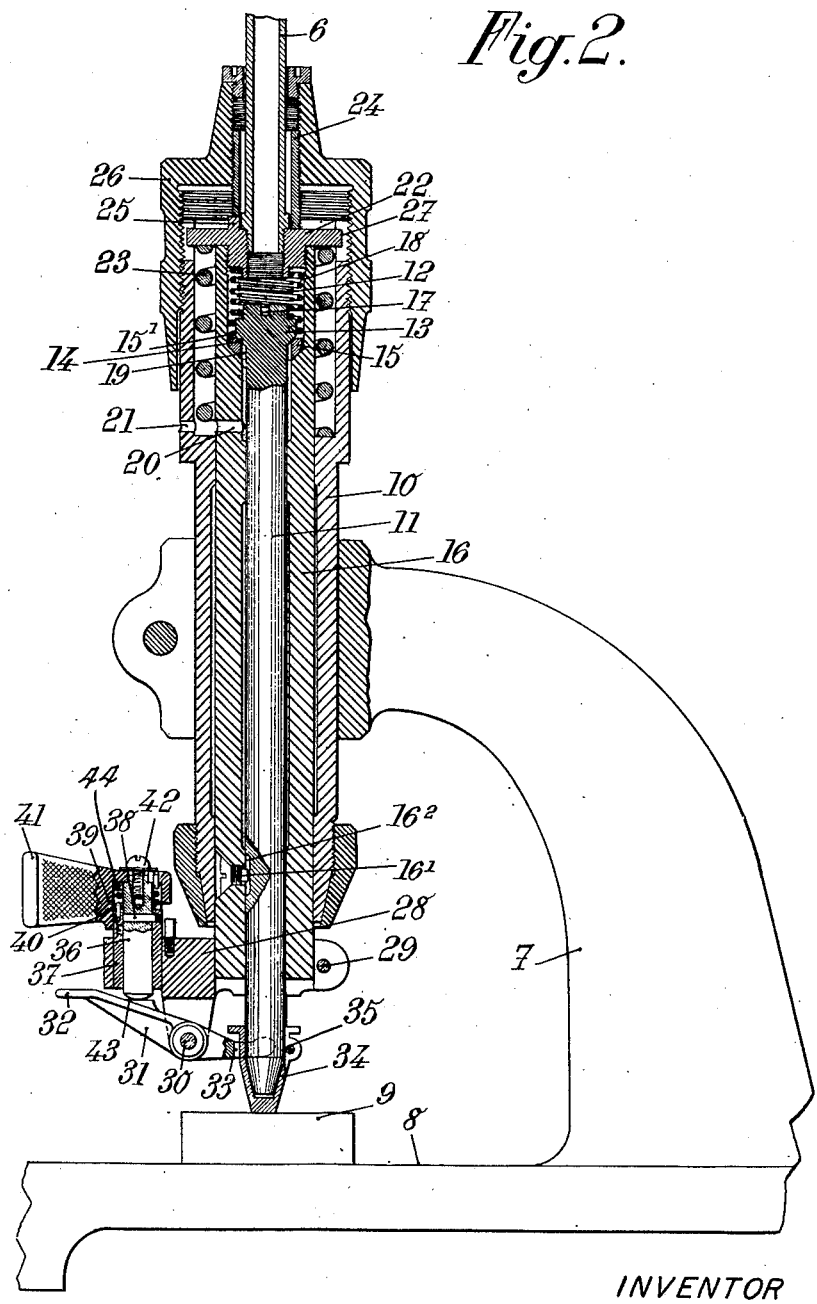

Patented Apr. 18, 1950

2,504,212

UNITED STATES PATENT OFFICE 2,504,212

APPARATUS FOR DETERMINING OR CHECKING THE DIMENSIONS OF A PIECE

Marcel Louis Mennesson, Neuilly-sur-Seine, France, assignor to Societe Anonyme de Construction de Materiel Automobile (S. A. C. M. A.), Neuilly-sur-Seine, Seine, France Application September 28, 1945, Serial No. 619,097
In France June 12, 1942

Section 1, Public Law 690, August 8, 1946
Patent expires June 12, 1962

2 Claims. (Cl. 33—143)

The present invention relates to apparatus for determining or checking the dimensions of a piece by means of a gaseous stream, these apparatus being of the kind set forth in the French Patents Nos. 685,416 and 722,685, filed by "Société Anonyme de Construction de Matériel Automobile," and in which manometric means are used for measuring the pressure drop undergone by a gas stream, of uniform initial pressure, when said gas stream is caused to flow through a passage the section of which is a function of the value of the dimension to be measured of the piece in question, whereby the manometric measurement thus performed can be used for determining said dimension or comparing it with that of a standard piece.

The object of the present invention is to provide an apparatus of this type which is better adapted to meet the requirements of practice than those used for the same purpose up to this time, in particular with a view to ensuring a simpler, quicker and more accurate adjustment thereof, and to facilitating their handling.

Other objects of my invention will result from the following detailed description of a specific embodiment thereof, with reference to the accompanying drawings, given merely by way of example, and in which:

Fig. 1 is an elevational view (partly diagrammatic) of a measurement apparatus made according to the invention;

Fig. 2 is an axial sectional view, on an enlarged scale, of one of the chief elements of the apparatus of Fig. 1.

The apparatus illustrated by the drawings includes a tube 1 connected with any suitable source of gas at constant pressure and opening into a chamber 2 through a calibrated orifice 3 the section of which can be adjusted by means of a needle valve 4 or any other suitable device. To this chamber is connected any suitable manometric device diagrammatically shown at 5. From chamber 2 starts a conduit 6 leading to the measurement apparatus proper. This apparatus includes a base 7 with a horizontal table 8 on which is placed the piece 9 the height of which is to be measured. This base also carries, through the intermediate of an arm, the hollow cylindrical body 10 of the measurement apparatus. Body 10 has a fixed but adjustable position in space. In this body is slidable a rod 11 which, at the time of a measurement operation, bears against the upper face of piece 9, being urged downwardly by a compression spring 12. The upper end of rod 11 is constituted by a valve head 13 which cooperates with a valve seat 14 housed in body 10. Valve head 13 is intended to cooperate with said seat 14 under the effect of its weight and of the thrust of spring 12. Advantageously, valve seat 14 is formed in an annular piece 15 housed, in a removable manner, in a bore provided in a tubular piece 16 which serves to the guiding of rod 11 and is, for this purpose, interposed between said rod 11 and the body 10 of the apparatus.

Piece 15 is applied against the bottom of the bore provided for it in piece 16, under the action of a powerful spring $15^1$ for instance. Preferably, this bottom is of conical shape so as to facilitate the fitting, positioning and withdrawing of piece 15 and valve seat 14. By making seat 14 removable, it is easy to vary the sensitivity of the apparatus by replacement of seat 14 or valve 13, or both.

Rod 11 is prevented from rotating about its axis, for instance by means of a lug $16^1$ carried by guide 16 and which is engaged in a longitudinal groove $16^2$ of said rod. In order to make it possible to obtain a fluidtight closing of valve 13, the latter is advantageously ground on its seat 14, for instance by rotating it through a diametral slot 17 provided in its upper end and which may be engaged by any tool analogous to a screwdriver.

In guide 16 and above ring 15 and valve head 13, there is provided a chamber 18 which communicates with the conduit 6 connected with the source of gas under pressure. This chamber 18 therefore constantly contains a fluid under pressure, which can flow out past valve 13 when said valve is more or less opened, the gas (air) escaping through an annular interval 19 provided between rod 11 and its guide 16 and through a radial passage 20 which communicates with the atmosphere through an orifice 31.

The degree of opening of valve 13 depends upon the position of rod 11, which in turn depends upon the height of the piece 9 to be measured. As a matter of fact, the passage existing between valve 13 and its seat 14 constitutes the orifice which determines the value of the pressure existing in chamber 18, conduit 6 and chamber 2, and therefore which is measured by manometric device 5. It is well known that it is advantageous, for comparation measurements, to be able to bring the manometric indication to a determined value, and as a rule to zero. This depends upon the degree of the opening of the valve and consequently of the height of piece 9 acting as a standard element.

In order to permit of performing this adjustment, I provide, between the fixed body 10 of the apparatus and the guide 16 of rod 11, which carries the valve seat 14, a micrometric mechanism of the differential screw type, through which it is possible to modify the degree of opening of said valve without varying the position of rod 11 with respect to body 10 and therefore to piece 9.

For this purpose, I fix on the upper end of guide 16 a cap 22, urged upwardly by a powerful spring 23 which bears against fixed body 10. This cap 22 is prolonged upwardly by a tubular piece 24 which may be integral with said cap 22, or rest freely thereon, while being angularly connected therewith by at least one lug 25 which cooperates with a notch provided in tubular piece 24.

Tubular piece 24 is screw threaded, for instance with a pitch of 1.25, so that it can be screwed in a threaded sleeve which surrounds the adjacent end of conduit 6 and which belongs to a cylindrical piece 26, screwed, through threads of a pitch of say 1.50, on the fixed body 10 of the apparatus.

Cap 22 is prevented from turning with respect to body 10, while being allowed to slide axially with respect thereto, due to the engagement of lugs 27 in longitudinal slots provided in said body 10.

By rotating piece 26 about its axis, I obtain the desired axial displacement of tubular piece 24 and cap 22 under the effect of the differential screw micrometric control resulting from the fact that the threads of piece 26 that cooperate with corresponding threads of body 10 on the one hand and tubular piece 24 on the other hand have different respective pitches.

It is thus possible to adjust in a very quick, easy and accurate manner, the degree of opening of the valve and therefore to choose, for this opening, a value corresponding to a given indication (for instance zero) of the manometric device.

In order to utilize the apparatus, I place, under rod 11, piece 9 used as a standard piece, which produces a certain opening of the valve. If necessary, the axial position of the whole of the apparatus with respect to base 7 is adjusted. Then, part 26 is moved, in the proper direction, for modifying the position of valve seat 14 with respect to valve 13, until the indication given by the manometric device 5 is of the desired value. The apparatus is then adjusted for subsequent use thereof, and it suffices to remove the standard piece and to replace it by another piece the height of which is to correspond to that of said standard piece. The indication given by the manometric device is then checked and if it is the same as that given for the measurement of the standard piece, the heights of the two pieces are exactly equal. Otherwise, if there is a difference, the height of the piece that is being measured is different from that of the standard piece and, account being taken of the tolerances that are permitted, it is decided whether the piece can be utilized or is to be rejected.

According to another feature of the present invention, the measurement apparatus is provided with means for easily and quickly lifting piece 11 for insertion and removal of the pieces 9 to be measured.

For this purpose, a support 28, adapted to be fixed through any suitable means, such for instance as a screw 29, is mounted on the lower end of guide 16.

On this support 28 is pivoted, at 30, a lever 31, including a handle 32 adapted to be easily reached, the end 33 of which bears under a flange of a removable sleeve 34 engaged on the lower end of rod 11 and held thereon through tightening means 35.

It is thus possible, by depressing handle 32 so as to pivot lever 31 about point 30, to impart a quick upward movement to rod 11 so as to remove it from the position of engagement with piece 9, so that this piece can be withdrawn and replaced by another one, while handle 32 is being kept depressed. As soon as this handle is released, rod 11 comes back into contact with piece 9 and a new measurement takes place as above set forth.

Advantageously, the system further includes means for producing the displacement of lever 31 about its axis 30 with a slow motion in one direction or the other. Said means also permit of keeping lever 31 in the upper position, which enables the operator to use both of his hands, since he can cease to act on handle 32.

These supplementary means may be constituted by a push piece 36 adapted to slide axially in a guiding sleeve 37 provided in a portion of support 28, this push piece being for instance controlled through a radial lug or pin 38 which extends therethrough and one free end of which cooperates with an inclined surface 39 formed by the edge of a groove provided in sleeve 37.

A cap 40, provided with an operating lever 41, is made rigid with push piece 36 by means of a screw 42. Consequently, when said cap 40 is caused to rotate about the axis of the push piece, the latter moves together with its pin 38 which, by coaction with inclined surface 39, causes push piece 36 to move axially in one direction or the other. This push piece bears freely, at 43, on lever 31 so that the latter is caused to lift rod 11 when the push piece is moved downwardly. On the contrary, when lever 41 is rotated in the opposed direction, the push piece is moved upwardly, which enables lever 31 to come back into inactive position, in which rod 11 is in contact with the piece 9 to be measured. A small return spring 44 may be provided between cap 40 and sleeve 37 for urging said cap 40 toward the inactive position thereof, in which end 32 of lever 31 is lifted.

Therefore, with this arrangement, rod 11 can be lifted either in a quick manner through the direct action of handle 32 on lever 31 or in a manner as slow as it may be desired, through angular displacement of lever 41. When a spring such as 44 is used, it suffices to release lever 41 for causing push piece 36 to return, preferably with a slow motion, into the inactive position thereof, in which lever 31 is lifted.

Of course, the micrometric screw initial adjustment means might be applied to all constructions of measurement apparatus of the type above set forth.

In a general manner, while I have, in the above description, disclosed what I deem to be practical and efficient embodiments of the present invention, it should be well understood that I do not wish to be limited thereto as there should be made allowance for modifications in the arrangement, disposition and form of the parts without departing from the principle of the present invention as comprehended within the scope of the appended claims.

What I claim is:

1. An apparatus for pneumatic measurement of a dimension of a piece which comprises, in combination, a support for said piece, a tubular body carried by said support, a vertical tubular guide slidable vertically in said body coaxially therewith, said guide being provided with a frusto-conical bearing, means for preventing rotation of said guide with respect to said body, a valve seat removably fitted in said bearing coaxially with said guide, a rod vertically slidable in said guide mounted to bear on the piece carried by said support so as to have its vertical position with respect to said body determined by the value of said dimension of said piece, a valve carried by said rod to cooperate with said valve seat, spring means between said guide and said body for urging said guide vertically in the upward direction, a cylindrical piece coaxial with said guide bearing on the top thereof, said cylindrical piece and said body being provided with screw threads of different respective pitches but of the same direction, and an annular part surrounding said body and said cylindrical piece and provided with screw threads in engagement with the threads on said cylindrical piece and said body respectively.

2. An apparatus for pneumatic measurement of a dimension of a piece which comprises, in combination, a support for said piece, a tubular body carried by said support, a vertical tubular guide slidable vertically in said body coaxially therewith, means for preventing rotation of said guide with respect to said body, a valve seat carried by said guide coaxially therewith, a rod vertically slidable in said guide mounted to bear on the piece carried by said support so as to have its vertical position with respect to said body determined by the value of said dimension of said piece, a valve carried by said rod to cooperate with said valve seat, spring means between said guide and said body for urging said guide vertically in the upward direction, a cylindrical piece coaxial with said guide bearing on the top thereof, said cylindrical piece and said body being provided with screw threads of different respective pitches but of the same direction, and an annular part surrounding said body and said cylindrical piece and provided with screw threads in engagement with the threads on said cylindrical piece and said body respectively.

MARCEL LOUIS MENNESSON.

REFERENCES CITED

The following references are of record in the file of this patent:

UNITED STATES PATENTS

| Number | Name | Date |
| --- | --- | --- |
| 1,954,442 | Dall et al. | Apr. 10, 1934 |
| 2,025,562 | Balsiger | Dec. 24, 1935 |
| 2,026,187 | Mennesson | Dec. 31, 1935 |
| 2,051,258 | Hunt | Aug. 18, 1936 |
| 2,190,306 | Balsiger | Feb. 13, 1940 |
| 2,276,036 | Hanna et al. | Mar. 10, 1942 |
| 2,306,469 | Rupley | Dec. 29, 1942 |
| 2,307,950 | Plant et al. | Jan. 12, 1943 |
| 2,357,569 | Wright et al. | Sept. 5, 1944 |
| 2,374,154 | Moore | Apr. 17, 1945 |

FOREIGN PATENTS

| Number | Country | Date |
| --- | --- | --- |
| 8,798 | Great Britain | Apr. 12, 1906 |
| 179,910 | Great Britain | July 11, 1923 |
| 812,000 | France | Jan. 27, 1937 |